(12) United States Patent
Takada et al.

(10) Patent No.: US 6,822,796 B2
(45) Date of Patent: Nov. 23, 2004

(54) DIFFRACTIVE OPTICAL ELEMENT

(75) Inventors: Kyu Takada, Otsu (JP); Takuji Hatano, Suita (JP); Koji Takahara, Amagasaki (JP); Koujirou Sekine, Ibaraki (JP)

(73) Assignee: Minolta Co. Ltd., Osaka (JP)

( * ) Notice: Subject to any disclaimer, the term of this patent is extended or adjusted under 35 U.S.C. 154(b) by 152 days.

(21) Appl. No.: 09/988,647

(22) Filed: Nov. 20, 2001

(65) Prior Publication Data

US 2002/0063962 A1 May 30, 2002

(30) Foreign Application Priority Data

Nov. 24, 2000 (JP) .......................................... 2000-356961

(51) Int. Cl.[7] ................................................. G02B 5/18
(52) U.S. Cl. ........................ 359/569; 359/571; 359/576
(58) Field of Search .................................. 359/569, 577, 359/571, 572, 576

(56) References Cited

U.S. PATENT DOCUMENTS 5,119,231 A * 6/1992 Nelson et al. ............... 359/359

FOREIGN PATENT DOCUMENTS

| JP | 7-234317 | 9/1995 |
|---|---|---|
| JP | 2000-199813 | 7/2000 |

* cited by examiner

Primary Examiner—Fayez Assaf
(74) Attorney, Agent, or Firm—Burns, Doane, Swecker & Mathis, L.L.P.

(57) ABSTRACT

A diffractive optical element has a diffraction grating formed by periodic depressions and projections on the surface of a substrate and a dielectric multilayer film on the diffraction grating. The materials of the respective layers of the film are chosen such that the depth of the depressions is an integral multiple of the sum of the thickness of the layers in one period of the film. As a result, individual layers of the film are continuous across multiple depressions and projections, to provide improved first-order reflectance.

31 Claims, 2 Drawing Sheets

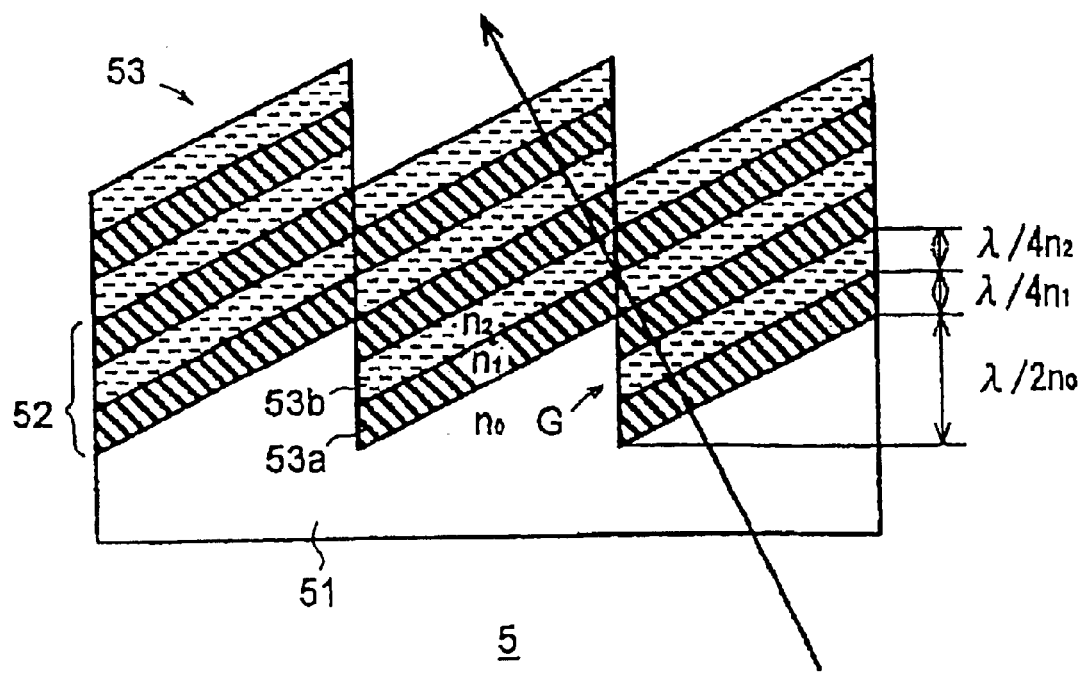
Fig. 4 CONVENTIONAL

DIFFRACTIVE OPTICAL ELEMENT

RELATED APPLICATION

This application is based on application No. 2000-356961 filed in Japan, the content of which is incorporated herein by reference.

1. Field of the Invention

The present invention relates to a diffractive optical element, and more particularly, to a diffractive optical element in which a dielectric multilayer film is provided on a diffraction grating.

2. Description of the Prior Art

Diffractive optical elements that diffract light are used in various types of apparatus that handle light, such as optical pickups, optical communication devices, laser beam printers, copiers and microscopes. Diffractive optical elements include a transmissive type that transmits light and diffracts the transmitted light, and a reflective type that reflects light and diffracts the reflected light. Both types comprise a substrate on a surface of which a diffraction grating, comprising periodically repeated minute depressions and projections, is formed. In reflective type diffractive optical elements, a reflecting film of a metal such as aluminum is provided on the diffraction grating. In transmissive type diffractive optical elements and reflective type optical elements used with light incident from the reverse side of the substrate, a transparent substrate is used.

Diffraction gratings are broadly divided into a blaze type with an inclined surface and a binary type with a horizontal surface. Blaze type diffraction gratings include one with a unidirectional surface inclination and one with a bidirectional surface inclination. Although both are triangular in cross section, the former has a sawtooth cross section and the latter has a V-shaped cross section. Binary type diffraction gratings include a two-level grating with only the highest level and the lowest level, and a multilevel grating with levels intermediate the highest and the lowest levels. The former has a rectangular cross section, and the latter has a step-shaped cross section comprising a set of rectangles. In blaze type diffraction gratings with a unidirectional surface inclination and two-level binary type diffraction gratings, a level difference perpendicular to the entire surface of the substrate is present on the borders between the depressions and projections. In multilevel binary type diffraction gratings, a perpendicular level difference is also present on the borders between the levels.

In recent years, it has been proposed to provide on the diffraction grating a dielectric multilayer film formed by alternately and periodically laminating dielectric layers with a high reflective index and dielectric layers with a low refractive index to thereby improve the reflectance of the diffractive optical element and improve the wavelength selectivity and the polarization selectivity of reflection. Such a diffractive optical element, which can function as the transmissive type or function as the reflective type, is high in utility.

An example of a diffractive optical element in which a dielectric multilayer film is provided on the diffraction grating is shown in FIG. 4. This diffractive optical element 5 comprises a substrate 51 and a dielectric multilayer film 53 comprising two kinds of dielectric layers 53a and 53b that are alternately laminated. A diffraction grating 52 is formed on a surface of the substrate 51. The diffraction grating 52 is a blaze type with a unidirectional surface inclination.

In a case where reflected light is diffracted, the first-order diffraction efficiency is highest when the optical level difference between the depressions and projections of the diffraction grating is ½ the wavelength of the light. Therefore, in a case where light is made incident from the reverse side of the substrate to obtain first-order reflected light, the physical level difference $h_0$ between the depressions and projections of the diffraction grating is set to $h_0 = \lambda/2n_0$ where the wavelength of the light to be reflected is $\lambda$ and the refractive index of the substrate is $n_0$. In a case where light is made directly incident on the dielectric multilayer film from the obverse side of the substrate, that is, from an air interface, to obtain first-order reflected light, since the refractive index of air is 1, the physical level difference $h_0$ is set to $h_0 = \lambda/2$.

The reflectance of the dielectric multilayer film is highest when the optical thicknesses of the layers are ¼ the wavelength of the light. Therefore, the physical thicknesses $h_1$ and $h_2$ of the two kinds of layers of the dielectric multilayer film are set to $h_1 = \lambda/4n_1$ and $h_2 = \lambda/4n_2$, where the refractive indices of the layers are $n_1$ and $n_2$.

By setting the diffraction grating and the dielectric multilayer film as described above in consideration of the wavelength of the light to be reflected, the wavelength selectivity is improved, and the desired light can be efficiently extracted as the reflected light and can be prevented from being mixed in transmitted light of a different wavelength. In addition, the polarization selectivity of a dielectric multilayer film that transmits p-polarized light and reflects s-polarized light is improved, so that separation between p-polarized light and s-polarized light is ensured.

However, in the conventional diffractive optical element in which the dielectric multilayer film is provided on the diffraction grating, although the physical level difference $h_0$ between the depressions and projections of the diffraction grating and the physical thicknesses $h_1$ and $h_2$ of the two kinds of layers of the dielectric multilayer film are set as mentioned above, these are individually decided and no consideration is given to the relationship among the level difference $h_0$ between the depressions and projections of the diffraction grating and the thicknesses $h_1$ and $h_2$ of the layers of the dielectric multilayer film. For this reason, in a structure in which the diffraction grating has a level difference, layers of the dielectric multilayer film having different refractive indices are in contact with each other at the level difference of the grating, so that the reflectance decreases.

This problem will be described with the diffractive optical element 5 of FIG. 4 as an example. Assuming now that the refractive index $n_0$ of the substrate 51 is 1.5 and the refractive indices $n_1$ and $n_2$ of the layers 53a and 53b of the dielectric multilayer film 53 are 2.5 and 1.875, respectively, a relationship $\lambda/2n_0 = \lambda/4n_1 + \lambda/4n_2 + \lambda/4n_1$ exists. That is, $h_0 = 2h_1 + h_2$, and the physical level difference $h_0$ between the depressions and projections of the diffraction grating 52 is the sum of twice the physical thickness $h_1$ of the layers 53a of the dielectric multilayer film 53 and the physical thickness $h_2$ of the layers 53b. Therefore, odd-numbered layers 53a with a high refractive index and even-numbered layers 53b with a low refractive index are in contact with each other in the region of the level difference G of the diffraction grating 52.

When light is obliquely incident on the diffractive optical element 5 from the reverse side of the substrate 51 (as depicted by the arrow) and reaches the area of the level difference G of the diffraction grating 52, the effective thicknesses $h_1$ and $h_2$ of the layers 53a and 53b for the light are shifted from $\lambda/4n_1$ and $\lambda/4n_2$ where the reflectance is highest, and become smaller than $\lambda/4n_1$ and $\lambda/4n_2$ or become twice $\lambda/4n_1$ and $\lambda/4n_2$, for example, $\lambda/2n_1$ and $\lambda/2n_2$ for the case of the light shown by the arrow. Consequently, the reflectance of the dielectric multilayer film 53 decreases, so that the light passes through the diffractive optical element 5 rather than being reflected.

Since light perpendicularly incident from the reverse side of the substrate 51 does not obliquely traverse the film in the area of the level difference G, it appears that the reflectance of the dielectric multilayer film 53 does not decrease for such light. However, the diffracted reflected light obliquely traverses the level difference G because it is not parallel to the level difference G, so that the reflectance decreases.

The decrease in the reflectance of the dielectric multilayer film 53, resulting from the layers 53a and 53b with different diffractive indices being in contact with each other at the level difference G of the diffraction grating 52, occurs not only when light is incident from the reverse side of the substrate 51, but also when light is directly incident on the dielectric multilayer film 53 from the obverse side of the substrate 51.

When the reflectance decreases, problems occur such that the quantity of the reflected light to be extracted decreases and that unnecessary light is mixed in the transmitted light to be extracted. Although the decrease in the reflectance of the dielectric multilayer film can be avoided by increasing the number of laminations of layers with a high refractive index and layers with a low refractive index, doing this increases the number of processes and the time for film formation, so that the manufacturing efficiency of the diffractive optical element significantly decreases.

SUMMARY OF THE INVENTION

An object of the present invention is to provide an improved diffractive optical element.

Another object of the present invention is to improve the reflectance of a diffractive optical element having a dielectric multilayer film on a diffraction grating having a level difference.

The above-mentioned objects are attained by a diffractive optical element comprising: a substrate on a surface of which a diffraction grating is formed; and a dielectric multilayer film provided on the diffraction grating on the surface of the substrate and in which the diffraction grating has a level difference substantially perpendicular to the entire surface of the substrate and the dielectric multilayer film is continuous across the level difference of the diffraction grating, such that only the same kind of dielectric layers included in the dielectric multilayer film are continuous across the level difference of the diffraction grating.

In this diffractive optical element, although the diffraction grating has a level difference, since different kinds of dielectric layers included in the dielectric multilayer film are not in contact with each other at the level difference of the diffraction grating, even when there is light obliquely traversing the area of the level difference, the effective thicknesses of the layers for the light do not change. Consequently, high reflectance is obtained.

Moreover, the above-mentioned objects are attained by a diffractive optical element comprising: a substrate on a surface of which a diffraction grating is formed; and a dielectric multilayer film provided on the diffraction grating on the surface of the substrate and in which the diffraction grating has a level difference substantially perpendicular to the entire surface of the substrate and the dielectric multilayer film is continuous across the level difference of the diffraction grating, wherein the size of the level difference of the diffraction grating is an integral multiple of the thickness of one period of the dielectric multilayer film.

When the size of the level difference of the diffraction grating is an integral multiple of the thickness of one period of the dielectric multilayer film, only the same kind of dielectric layers are continuous across the level difference of the diffraction grating. Consequently, high reflectance is obtained. Setting the size of the level difference of the diffraction grating to be an integral multiple of the thickness of one period of the dielectric multilayer film can be easily realized depending on the setting of the refractive indices of the layers of the dielectric multilayer film.

Moreover, to solve the above-mentioned objects, according to the present invention, in a diffractive optical element comprising a substrate on a surface of which a diffraction grating is formed; and a dielectric multilayer film provided on the diffraction grating on the surface of the substrate and in which the diffraction grating has a level difference substantially perpendicular to the entire surface of the substrate and the dielectric multilayer film is continuous across the level difference of the diffraction grating, the size of the level difference of the diffraction grating is an integral multiple of the thickness of one period of the dielectric multilayer film.

When the size of the level difference of the diffraction grating is an integral multiple of the thickness of one period of the layers included in the dielectric multilayer film, only the same kind of dielectric layers are continuous across the level difference of the diffraction grating. Consequently, high reflectance is obtained. Setting the size of the level difference of the diffraction grating to an integral multiple of the thickness of one period of the dielectric multilayer film can be easily realized depending on the setting of the refractive indices of the layers of the dielectric multilayer film.

In this case, the dielectric multilayer film has only two kinds of layers in one period, and the relationship of the following equation (1) is satisfied:

$$2/n_0 = m(1/n_1 + 1/n_2) \quad (1)$$

where $n_0$ is the refractive index of the substrate, $n_1$ and $n_2$ are the refractive indices of the two kinds of layers of the dielectric multilayer film, and m is an integer not less than 1.

The dielectric multilayer film having only two kinds of layers in one period has the simplest structure, and is easy to manufacture. By satisfying equation (1), the size of the level difference of the diffraction grating is an integral multiple of the thickness of one period of the dielectric multilayer film, and at the same time, the relationships $h_0 = \lambda/2n_0$, $h_1 = \lambda/4n_1$, and $h_2 = \lambda/4n_2$ hold. Therefore, when light is incident from the reverse side of the substrate, first-order reflected light can be efficiently obtained.

The dielectric multilayer film may have only two kinds of layers in one period and satisfy the relationship of the following equation (2):

$$2 = m(1/n_1 + 1/n_2) \quad (2)$$

where n1 and $n_2$ are the refractive indices of the two kinds of layers of the dielectric multilayer film, and m is an integer not less than 1.

By satisfying equation (2), the size of the level difference of the diffraction grating is an integral multiple of the thickness of one period of the dielectric multilayer film, and at the same time, the relationships $h_0=\lambda/2$, $h_1=\lambda/4n_1$ and $h_2=\lambda/4n_2$ hold. Therefore, when light is directly incident on the dielectric multilayer film from the obverse side of the substrate, first-order reflected light can be efficiently obtained.

BRIEF DESCRIPTION OF THE DRAWINGS

These and other objects and features of this invention will become clear from the following description, taken in conjunction with the preferred embodiments with reference to the accompanying drawings in which:

FIG. 4 is a cross-sectional view schematically showing the structure of a conventional diffractive optical element.

DESCRIPTION OF PREFERRED EMBODIMENTS

Figure 1:
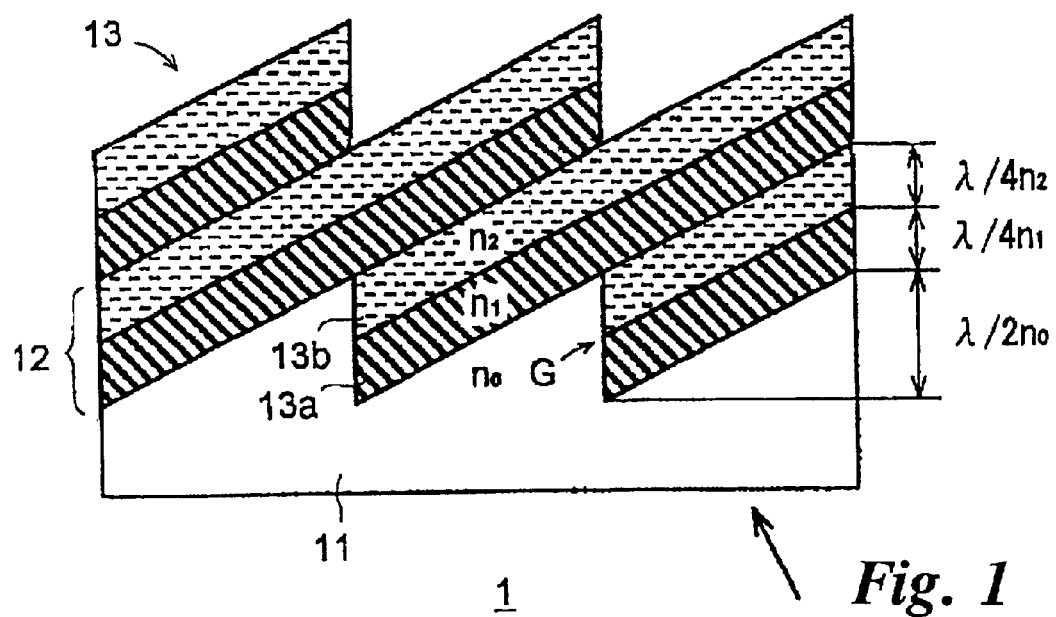
FIG. 1 is a cross-sectional view schematically showing the structure of a diffractive optical element according to a first embodiment.

Embodiments of the diffractive optical element of the present invention will now be described with reference to the drawings. The cross section of a diffractive optical element 1 of a first embodiment is schematically shown in FIG. 1. The diffractive optical element 1 comprises a substrate 11 on a surface of which a diffraction grating 12 is formed, and a dielectric multilayer film 13 formed on the diffraction grating 12. The diffraction grating 12 is a blaze type with a unidirectional surface inclination, and has a level difference G on the borders between the depressions and projections. The dielectric multilayer film 13 is formed by alternately laminating two kinds of dielectric layers 13a and 13b having different refractive indices. The thickness of the dielectric multilayer film 13 is larger than the level difference G of the diffraction grating 12. The dielectric multilayer film 13 is continuous across the level difference G.

The diffractive optical element 1 is set so that when light is incident from the reverse side of the substrate 11, light of a predetermined wavelength is selectively reflected and first-order diffraction is caused on the reflected light. Hereinafter, the wavelength of the light to be reflected will be denoted by $\lambda$; the refractive index of the substrate 11, $n_0$; the refractive index of the dielectric layer 13a, $n_1$; the refractive index of the dielectric layer 13b, $n_2$; the size of the physical level difference, that is, the level difference G between the depressions and projections of the diffraction grating 12, $h_0$; the physical thickness of the dielectric layer 13a, $h_1$; and the physical thickness of the dielectric layer 13b, $h_2$.

The physical level difference $h_0$ between the depressions and projections of the diffraction grating 12 and the refractive index $n_0$ of the substrate 11 are set so as to satisfy a relationship $h_0=\lambda/2n_0$. The physical thicknesses $h_1$ and $h_2$ of the two kinds of dielectric layers 13a and 13b and the refractive indices $n_1$ and $n_2$ thereof are set so as to satisfy relationships $h_1=\lambda/4n_1$ and $h_2=\lambda/4n_2$, respectively. Consequently, the first-order diffraction efficiency of the reflected light by the diffraction grating 12 is high, and the reflectance of the dielectric multilayer film 13 is also high.

Further, the physical level difference $h_0$ between the depressions and projections of the diffraction grating 12 and the physical thicknesses $h_1$ and $h_2$ of the two kinds of dielectric layers 13a and 13b are set so as to satisfy the following equation (3):

$$h_0=h_1+h_2 \quad (3)$$

Therefore, at the level difference G of the diffraction grating 12, the k-th layer on the projection side (k is an integer not less than 1) and the (k+2)-th layer on the depression side are at the same level. Since the k-th layer and the (k+2)-th layer are both the layers 13a or the layers 13b, only the same kind of layers are continuous across the level difference G. That is, the layers 13a and 13b having different refractive indices are not in contact with each other at the level difference G.

In this structure, for the light shown by the arrow obliquely incident from the reverse side of the substrate 11 and obliquely traversing the area of the level difference G, as well as light perpendicularly incident from the reverse side of the substrate 11 and diffracted to obliquely traverse the part on the level difference G, the effective physical thicknesses $h_1$ and $h_2$ of the dielectric layers 13a and 13b do not change and remain $\lambda/4n_1$ and $\lambda/4n_2$. That is, the reflectance of the dielectric multilayer film 13 is the same at all the parts including the part at the level difference G of the diffraction grating 12, and is high.

Substituting the relationships $h_0=\lambda/2n_0$, $h_1=\lambda/4n_1$ and $h_2=\lambda/4n_2$ into equation (3) and simplifying equation (3), the following equation (4) is obtained:

$$2/n_0=1/n_1+1/n_2 \quad (4)$$

Equation (4) defines the relationship among the refractive index $n_0$ of the substrate and the refractive indices $n_1$ and $n_2$ of the dielectric layers 13a and 13b, and holds, for example, when n=1.5, n=1.38 and $n_2$=1.643. It is easy to select a material having a refractive index satisfying the relationship of equation (4) from among various kinds of optical materials. In practice, the refractive index $n_0$ of the substrate 11 is decided in consideration of the wavelength $\lambda$ of the light to be reflected, and then, the refractive indices $n_1$ and $n_2$ of the dielectric layers 13a and 13b are decided so as to satisfy equation (4) in consideration of the wavelength $\lambda$ and the refractive index $n_0$ of the substrate 11.

In a case where light is obliquely incident on the diffractive optical element 1, when the incident angle of the light is $\theta$, the refractive indices are set so as to satisfy relationships $h_0=\lambda/2n_0 \cos\theta$, $h_1=\lambda/4n_1 \cos\theta$ and $h_2=\lambda/4n_2 d \cos\theta$. In this case, equation (3) also holds when the relationship of equation (4) is satisfied, and only the same kind of dielectric layers are continuous across the level difference G of the diffraction grating 12.

Hereinafter, other embodiments of the present invention will be described. Components having functions the same as or similar to those of the diffractive optical element 1 are denoted by the same reference numbers and no duplicative descriptions of these elements will be given. The refractive indices and the thicknesses of the substrate and the dielectric layers are also denoted by the same reference designations.

Figure 2:
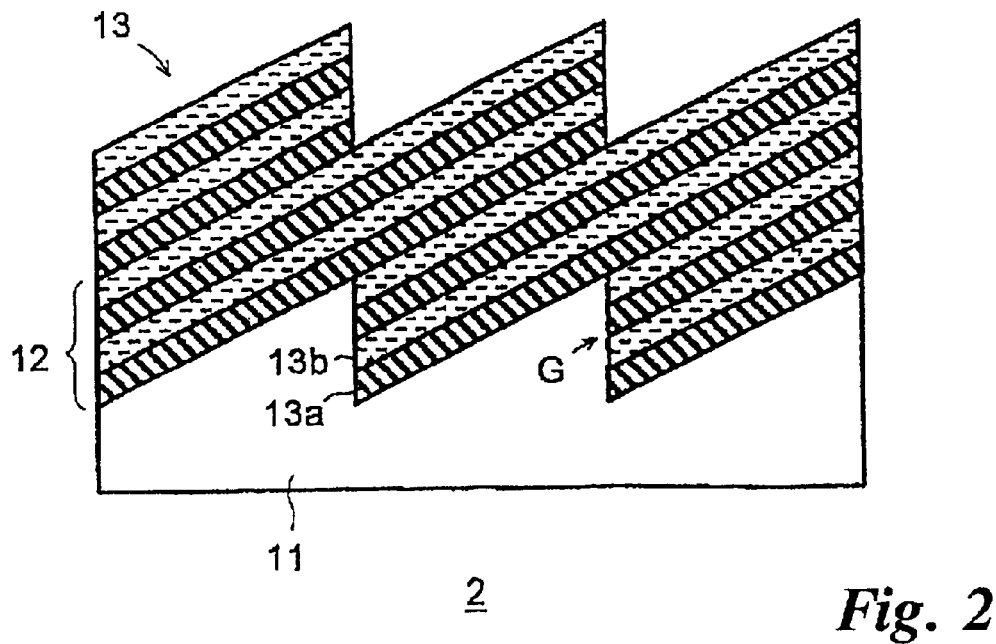
FIG. 2 is a cross-sectional view schematically showing the structure of a diffractive optical element according to a second embodiment.

The cross section of a diffractive optical element 2 of a second embodiment is schematically shown in FIG. 2. The diffractive optical element 2 is the diffractive optical element 1 of the first embodiment modified so that the physical level difference $h_0$ between the depressions and projections of the substrate 11 and the physical thicknesses $h_1$ and $h_2$ of the two kinds of dielectric layers 13a and 13b constituting the dielectric multilayer film 13 satisfy the relationship of the following equation (5):

$$h_0 = 2(h_1 + h_2) \tag{5}$$

Therefore, at the level difference G of the diffraction grating 12, the k-th layer on the projection side and the (k+4)-th layer on the depression side are at the same level. In this structure, only the same kind of layers are continuous across the level difference G, so that the light incident from the reverse side of the substrate 11 can be reflected with a high magnitude of reflectance.

Substituting the relationships $h_0 = \lambda/2n_0$, $h_1 = \lambda/4n_1$ and $h_2 = \lambda/4n_2$ in equation (5) and simplifying equation (5), the following equation (6) is obtained:

$$1/n_0 = 1/n_1 + 1/n_2 \tag{6}$$

Equation (6) holds, for example, when $n_0 = 1.5$, $n_1 = 3.3$ and $n_2 = 2.75$. When the physical level difference $h_0$ between the depressions and projections of the diffraction grating 12 and the refractive index $n_0$ of the substrate 11 are the same as those of the diffractive optical element 1, since the sum $(h_1 + h_2)$ of the physical thicknesses of the two kinds of dielectric layers 13a and 13b of the dielectric multilayer film 13 is halved, the refractive indices $n_1$ and $n_2$ of the dielectric layers 13a and 13b are increased.

Figure 3:
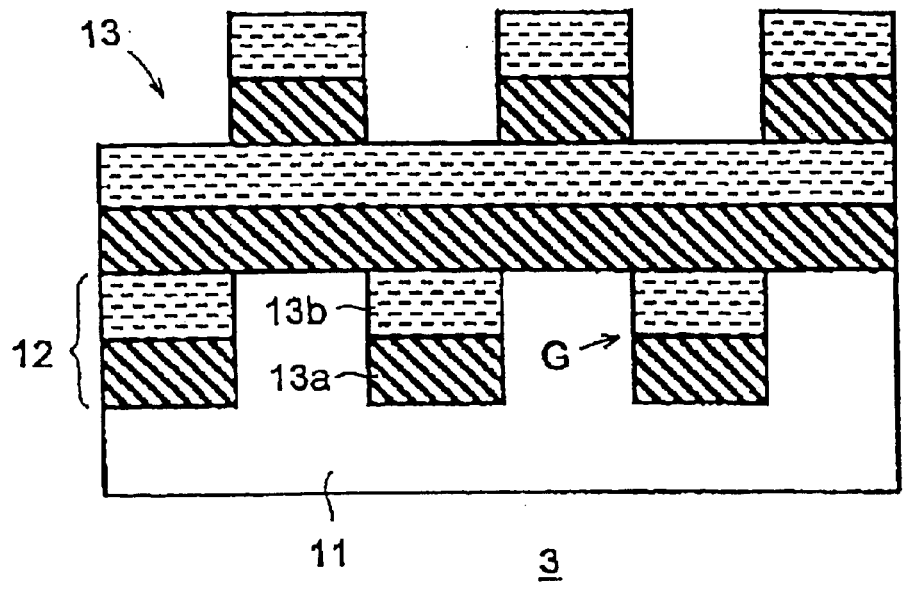
FIG. 3 is a cross-sectional view schematically showing the structure of a diffractive optical element according to a third embodiment.

The cross section of a diffractive optical element 3 of a third embodiment is schematically shown in FIG. 3. In the diffractive optical element 3, the diffraction grating 12 formed on a surface of the substrate 11 is a two-level binary type. The physical level difference $h_0$ between the depressions and projections of the diffraction grating 12 and the physical thicknesses $h_1$ and $h_2$ of the two kinds of dielectric layers 13a and 13b constituting the dielectric multilayer film 13 are set so as to satisfy the relationship of equation (3) like the diffractive optical element 1 of the first embodiment. Therefore, only the same kind of dielectric layers are continuous across the level difference G of the diffraction grating 12, so that the light incident from the reverse side of the substrate 11 can be reflected with high reflectance.

While in the diffractive optical elements 1 to 3 of the first to the third embodiments, the k-th layer and the (k+2)-th layer of the dielectric multilayer film 13 or the k-th layer and the (k+4)-th layer are continuous across the level difference G of the diffraction grating 12, the k-th layer and the (k+2i)-th layer (i is an integer not less than 3) may be continuous. Therefore, the refractive index $n_0$ of the substrate 11 and the refractive indices $n_1$ and $n_2$ of the two kinds of layers 13a and 13b of the dielectric multilayer film 13 satisfy the relationship of equation (1). Here, m is an integer not less than 1.

$$2/n_0 = m(1/n_1 + 1/n_2) \tag{1}$$

(shown again)

While the diffractive optical elements 1 to 3 are used with light that is incident from the reverse side of the substrate, the present invention is also applicable when the optical element is used with light that is directly incident on the dielectric multilayer film 13 from the observed side of the substrate 11. In that case, since the medium immediately before the dielectric multilayer film 13 is air, the refractive index of air, 1, is substituted for $n_0$ of equation (1). That is, the refractive indices $n_1$ and $n_2$ of the two kinds of layers 13a and 13b of the dielectric multilayer film 13 are set so as to satisfy the relationship of equation (2):

$$2 = m(1/n_1 + 1/n_2) \tag{2}$$

(shown again)

Further, the present invention is applicable to a diffractive optical element in which the diffraction grating is a multi-level binary type. In that case, the dielectric multilayer film is formed so as to have a thickness not less than the difference between the highest level and the lowest level of the diffraction grating and so that the refractive indices satisfy the relationship of equation (1) or (2).

While in these embodiments, the dielectric multilayer film 13 has the simplest structure in which only two kinds of dielectric layers 13a and 13b are included in one period of the lamination, the dielectric multilayer film may have a structure in which three or more kinds of dielectric layers are included in one period. In that case, letting the total number of kinds of dielectric layers in one period be j, the relationship of the following equation (7) or (8) is satisfied:

$$2/n_0 = m(1/n_1 + 1/n_2 + \ldots + 1/n_j) \tag{7}$$

$$2 = m(1/n_1 + 1/n_2 + \ldots + 1/n_j) \tag{8}$$

When second- or higher-order diffraction is desired for the reflected light, the physical level difference $h_0$ between the depressions and projections of the diffraction grating and the refractive index $n_0$ of the substrate are set to satisfy a relationship different from $h_0 = \lambda/2n_0$. In that case, the left sides of equations (1) and (2) or equations (7) and (8) are decided in accordance with the equations suitable for the order of the diffraction.

The diffractive optical element of the present invention in which, of the layers included in the dielectric multilayer film, only the same kind of dielectric layers are continuous across the level difference of the diffraction grating, exhibits high reflectance, because even when there is light obliquely traversing the region of the level difference, the thicknesses of the layers for the light do not change. Consequently, when reflected light is used, desired reflected light is efficiently obtained, and when transmitted light is used, the mixing of unnecessary light in desired transmitted light is avoided.

The diffractive optical element of the present invention in which the size of the physical level difference of the diffraction grating is an integral multiple of the thickness of one period of the dielectric multilayer film also exhibits high reflectance, because only the same kind of dielectric layers are continuous across the level difference of the diffraction grating.

In a structure in which the dielectric multilayer film has only two kinds of layers in one period and the relationship of equation (1) or (2) is satisfied, the dielectric multilayer film is easy to manufacture, first-order diffraction is most efficiently caused on the reflected light, and the reflectance of the dielectric multilayer film is highest. Consequently, an element suitable for common uses is obtained. A structure that satisfies equation (1) is suitable for a usage pattern in which light is made incident from the reverse side of the substrate, and a structure that satisfies equation (2) is suitable for a usage pattern in which light is made directly incident on the dielectric multilayer film from the obverse surface side of the substrate.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A diffractive optical element comprising:
   a substrate on which a diffraction grating is formed, said diffraction grating having a level difference substantially perpendicular to a first surface of the substrate; and
   a dielectric multilayer film that conforms to the diffraction grating, wherein the layers included in said dielectric multilayer film are arranged such that only the same kind of layers are continuous across the level difference of the diffraction grating.

2. The diffractive optical element of claim 1, wherein said level difference has a height which is greater than the thickness of each individual layer of said dielectric film.

3. The diffractive optical element as claimed in claim 1, wherein a surface between adjoining level differences of the diffraction grating is inclined with respect to said first surface of the substrate.

4. The diffractive optical element as claimed in claim 1, wherein a surface between adjoining level differences of the diffraction grating is substantially parallel to said first surface of the substrate.

5. The diffractive optical element as claimed in claim 1, wherein said diffraction grazing is a blaze type.

6. The diffractive optical element as claimed in claim 1, wherein said diffraction grating is a binary type.

7. A diffractive optical element comprising:
   a substrate on which a diffraction grating is formed, said diffraction grating having a level difference substantially perpendicular to a first surface of the substrate; and
   a dielectric multilayer film provided on the diffraction grating wherein at least some of the dielectric layers included in said dielectric multilayer film are continuous across a level difference of the diffraction grating, and wherein the level difference of the diffraction grating has a size that is an integral multiple of a thickness of one period of the dielectric multilayer film.

8. The diffractive optical element as claimed in claim 7, wherein said dielectric multilayer film has only two kinds of layers in one period, where $n_0$ is a refractive index of the substrate, $n_1$ and $n_2$ are refractive indices of the two kinds of layers of the dielectric multilayer film, and m is an integer not less than 1, and the following equation is satisfied:

$$2/n_0 = m(1/n_1 + 1/n_2).$$

9. The diffractive optical element as claimed in claim 8, wherein light is incident on a surface of the substrate where the diffraction grating is not formed.

10. The diffractive optical element as claimed in claim 7, wherein said dielectric muitilayer film has only two kinds of layers in one period, where $n_1$ and $n_2$ are refractive indices of the two kinds of layers of the dielectric multilayer film, and m is an integer not less than 1, and the following equation is satisfied:

$$2 = m(1/n_1 + 1/n_2).$$

11. The diffractive optical element as claimed in claim 10, wherein light is incident on the surface of the substrate where the diffraction grating is formed.

12. The diffractive optical element as claimed in claim 7, wherein said dielectric multilayer film has a number, j, of kinds of layers in one period, where $n_0$ is a refractive index of the substrate, $n_1, \ldots, n_j$ are refractive indices of the different kinds of layers of the dielectric multilayer film, and m is an integer not less than 1, and the following equation is satisfied:

$$2/n_0 = m(1/n_1 + \ldots + 1/n_j).$$

13. The diffractive optical element as claimed in claim 12, wherein light is incident on a surface of the substrate where the diffraction grating is not formed.

14. The diffractive optical element as claimed in claim 7, wherein said dielectric multilayer film has a number, j, of kinds of layers in one period, where $n_1, \ldots, n_j$ are refractive indices of the different kinds of layers of the dielectric multilayer film, and m is an integer not less than 1, and the following equation is satisfied:

$$2 = m(1/n_1 + \ldots + 1/n_j).$$

15. The diffractive optical element as claimed in claim 14, wherein light is incident on the surface of the substrate where the diffraction grating is formed.

16. The diffractive optical element as claimed in claim 7, wherein a surface between adjoining level differences of the diffraction grating is inclined with respect to said first surface of the substrate.

17. The diffractive optical element as claimed in claim 7, wherein a surface between adjoining level differences of the diffraction grating is substantially parallel to said first surface of the substrate.

18. The diffractive optical element as claimed in claim 7, wherein said diffraction grating is a binary type.

19. The diffractive optical element as claimed an claim 7, wherein said diffraction grating is a blaze type.

20. A method of manufacturing a diffractive optical element, comprising:
   a first step of forming on a surface of a substrate a diffraction grating having a level difference substantially perpendicular to a surface of the substrate; and
   a second step of forming a dielectric multilayer film that conforms to the diffraction grating on the surface of the substrate so that only the same kind of dielectric layers included in the dielectric multilayer film are continuous across the level difference of the diffraction grating.

21. The method of claim 20 wherein said level difference has a height which is greater than the thickness of each individual layer of said dielectric film.

22. The method of claim 20, wherein said dielectric multilayer film comprises two kinds of layers, and further including the step of selecting materials for said two kinds of layers which satisfy the following condition:

$$2/n_0 = m(1/n_1 + 1/n_2),$$

where $n_0$ is the refractive index of the substrate,
$n_1$ is the refractive index of one kind of layer,
$n_2$ is the refractive index of the other kind of layer, and
m is an integer greater than zero.

23. The method of claim 20, wherein said dielectric multilayer film comprises j kinds of layers, where j is an integer greater than one, and further including the step of selecting materials for each of said layers which satisfy the following condition:

$$2/n_0 = m(1/n_1 + \ldots + 1/n_j)$$

where $n_0$ is the refractive index of the substrate,
$n_1$ is the refractive index of a layer i of said film, i=1, ..., j, and
m is an integer greater than zero.

24. A diffractive optical element, comprising:
   a substrate having a diffraction grating formed by periodic depressions and projections on a surface thereof; and a dielectric film that conforms to said diffraction grating, said film comprising multiple layers of different kinds of dielectric material wherein at least some of said individual layers are continuous across plural successive depressions and projections of said diffraction grating.

25. The diffractive optical element of claim 24, wherein said level difference has a height which is greater than the thickness of each individual layer of said dielectric film.

26. The diffractive optical element of claim 24, wherein said diffraction grating is of the blaze type, and wherein each of said layers is continuous across at least two successive depressions and projections of said diffraction grating.

27. The diffractive optical element of claim 24, wherein said diffraction grating is of the binary type, and wherein at least some of said layers are continuous across all of the depressions and projections of said diffraction grating.

28. The diffractive optical element of claim 24, wherein said dielectric film comprises j different kinds of layers, where j is an integer greater than one, and the respective materials of said different kinds of layers satisfy the following condition:

$$2/n_0 = m(1/n_1 + \ldots + 1/n_j)$$

where $n_0$ is the refractive index of the substrate,
$n_1$ is the refractive index of a layer i of said film, i=1, ..., j, and
m is an integer greater than zero.

29. The diffractive optical element of claim 28, where j=2.

30. A diffractive optical element, comprising:

a substrate having a diffraction grating formed by a series of depressions in a surface of said substrate, each of said depressions having a predetermined depth; and a dielectric film on said surface of the substrate, comprising a plurality of layers of different kinds of materials arranged in a periodic manner, said layers having a thickness such that said predetermined depth is an integral multiple of one period of said layers.

31. The diffractive optical element of claim 30, wherein said dielectric film comprises j different kinds of layers, where j is an integer greater than one, and the respective materials of said different kinds of layers satisfy the following condition:

$$2/n_0 = m(1/n_1 + \ldots + 1/n_j)$$

where $n_0$ is the refractive index of the substrate,
$n_1$ is the refractive index of a layer i of said film, i=1, ..., j, and
m is an integer greater than zero.

* * * * *